Feb. 24, 1970  R. W. HUGHES  3,496,960
AUTOMATIC VOLUMETRIC FLUID CONTROL SYSTEM
Filed Nov. 30, 1967
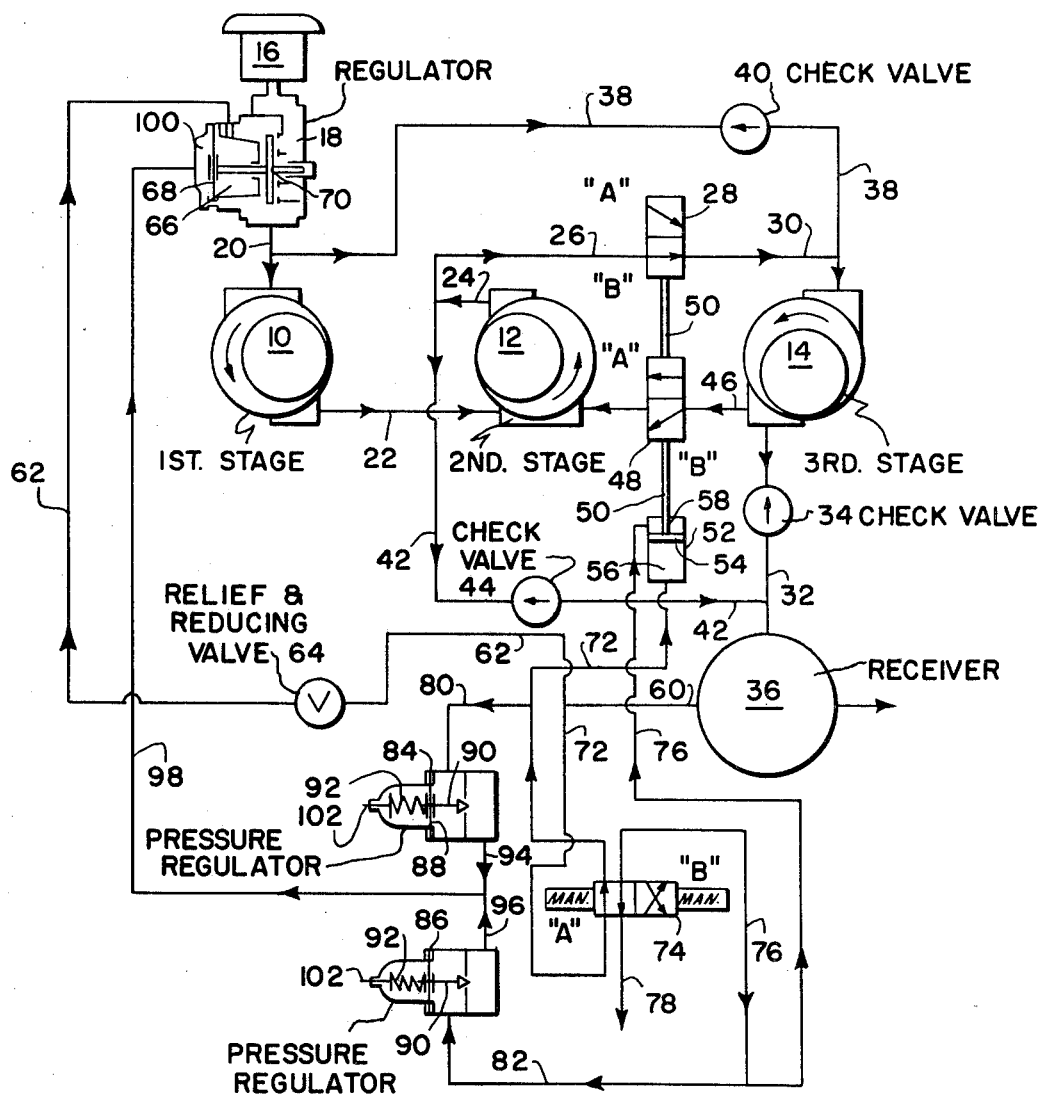
INVENTOR.
ROBERT W. HUGHES
BY
*Bernard J. Murphy*
AGENT United States Patent Office 3,496,960
Patented Feb. 24, 1970

3,496,960
AUTOMATIC VOLUMETRIC FLUID CONTROL SYSTEM
Robert W. Hughes, Northampton, Pa., assignor to Ingersoll-Rand Company, New York, N.Y., a corporation of New Jersey
Filed Nov. 30, 1967, Ser. No. 692,255
Int. Cl. F04d 15/02; F17d 3/00, 1/02
U.S. Cl. 137—567
9 Claims

ABSTRACT OF THE DISCLOSURE

Valving arranged to serialize all stages or to parallel some stages of a plural-stage fluid-working apparatus, to establish distinct output fluid pressures and volume control; and control means for automatic unloading and for locking of the system in parallel or serial operation.

This invention pertains to fluid control systems, used with plural-stage fluid-working apparatus, with means to switch the stages thereof between serial and parallel operations, and in particular to such systems having means for locking the system in the switch-selected modes of operation.

Switch-selected, serial-to-parallel fluid control systems are known in the prior art. The earlier of such systems which are known incorporate hand valves in the input and output lines of the stages to switch the modes of operation from serial to parallel. Latter-developed arrangements are known which use cross-guides, or the like, movable to align differing stages' inlet and outlet ports, or some similar, wholly mechanically-integrated means to effect the transfer of the operational modes.

Therefore, the known systems more recently developed are intricately complicated, in having variously-ported and channeled sleeves or guides, a multiplicity of seals and sealing surfaces, and rods, bearing, and trunnions, or the like, to support the movements of the sliding or rotating elements. These latter arrangements, while operative, are complex of manufacture, assembly, and maintenance, and necessarily introduce high parts mortality.

Burdensomely, the earlier known means require an operators' manipulation of a pair of valves at either sides of each inlet and outlet of each stage.

It is an object of this invention, therefore, to provide an automatic volumetric fluid control system which selectively employs the pressure of the fluid being worked to effect a transfer from one mode, in a plurality of modes of operation for a plural-stage fluid-working apparatus, to another mode thereof.

Another object of this invention is to provide a fluid control system of the type specified which uses the fluid pressure to lock the system, selectively, in any operational mode of said plurality.

Another object of this invention is to provide a fluid control system, in accordance with the aforementioned types, incorporating means for automatic unloading in any operational mode of said plurality. Another object of this invention is to provide a fluid control system, operable of a plural-stage fluid-working apparatus in a plurality of operational modes, providing for an increased fluid discharge volume in one of the operational modes. Yet another object of this invention is to provide a fluid control system, operable of a plural-stage fluid-working apparatus in a plurality of operational modes, providing differing fluid pressure levels in said modes, and having inherent safety means for automatic unloading thereof coincident with a transfer from a given fluid pressure level mode of operation to a lower fluid pressure level mode of operation.

Still another object of this invention is to provide a fluid control system, usable with a serially-arranged, plural-stage, fluid-working apparatus, operable to change the functioning of the apparatus to effect a paralleled-arrangement of some of the stages thereof.

A feature of this invention comprises the use of a valve in a receiver pressure-monitor line manually operative to direct fluid to either ends of a piston actuator, the latter being effective to reverse the direction of fluid flow between given stages.

Another feature of this invention comprises the use of pressure-set check valves to accommodate or to prohibit fluid flow therethrough.

Further objects and features of this invention will become more apparent by reference to the following discussion taken in conjunction with the figure, a schematic diagram of a plural-stage fluid control system according to the invention.

The embodiment of the novel system shown in the figure, by way of example, is deployed in conjunction with a plural-stage gas compressor incorporating sliding-vane type compressor stages. Clearly, other types of gas compressor stages can be employed, i.e., lobe rotor, piston, and the like. So also, the fluid-working stages could just as well be pumping stages or blower stages, used to work liquid fluids no less than gaseous fluids. Thus, differing types of associated fluid-working apparatus can use the novel system taught herein without departing from the spirit of my invention.

In the figure is shown a three-stage fluid-working apparatus comprising a first stage 10, and a second stage 12, and third stage 14. My novel system, hereinafter described comprises a filter 16 which receives the fluid input and communicates it therefrom to an intake regulator 18. An inlet line 20 feeds the fluid intake from regulator 18 to first stage 10. Outlet line 22 communicates the fluid from first stage 10 to second stage 12. An outlet line 24 communicates the output of the second stage 12 with a connecting line 26; line 26 is next through-connected with a first control valve 28. An inlet line 30 communicates the fluid from the first control valve 28 to the input of the third stage 14. Finally, a receiver first inlet line 32 communicates the final product by way of a first check valve 34 to a receiver 36.

A by-pass line 38 also throughconnects first stage inlet line 20 with third stage inlet line 30. A second check valve 40 is interposed in this by-pass line 38. Receiver 36 also has a second inlet line 42 communicating between the outlet of second stage 12 and first inlet line 32 by way of a third check valve 44. Also an interstage line 46 communicates between second and third stages 12 and 14 by way of a second control valve 48.

First control valve 28 and second control valve 48 are ganged by coupling means 50. Coupling means 50 comprise a rod or like member by means of which operation of one control valve is accompanied by a synchronous operation of the other control valve. Control valves 28 and 48 have two functional positions. In position "A" as represented in the figure, control valve 28 is open for fluid flow therethrough and control valve 48 is closed. In the alternate position "B" the reverse is true.

Coupling means 50 is further connected to a piston actuator 52. The piston actuator comprises a piston 54 movable within a chamber 56. One end 58 of coupling means 50 is secured to the piston 54 to insure that any translation of piston 54 within chamber 56 causes a synchronous motion of control valves 28 and 48 therewith.

A receiver pressure-monitor line 60 is through-connected with a bias line 62 communicating with the intake regulator 18. A first reducing and relief valve 64 is interposed in bias line 62. Bias line 62 communicates a biasing fluid pressure from the receiver 36 by way of valve 64 to a bias pressure chamber 66 which is part of the intake regulator 18. Disposed across and sealing pressure chamber 66, in regulator 18, is a diaphragm 68 against which the bias pressure operates. Diaphragm 68 carries a rod and closure member assembly 70 by means of which regulator 18 is throttled.

A first piston control line 72 is also through-connected with the receiver pressure-monitor line 60 to communicate fluid therethrough to a two-position (i.e., "A" and "B") 4-way valve 74. Fluid pressure is communicated via line 72 through the 4-way valve 74, in the "A" position setting thereof, to one end of chamber 56 to operate upon the piston 54. A second piston control line 76 is in communication with the opposite end of chamber 56 and is communicated to 4-way valve 74 for fluid flow therethrough via a channel in valve 74 which is distinct from the channel through which line 72 communicates. Second piston control line 76 is communicated, through 4-way valve 74, with the atmosphere via vent line 78 in the "A" position illustrated in the figure.

A pilot pressure line 80 is connected to the first piston control line 72, and second pilot pressure line 82 is connected to the second piston control line 76. Lines 80 and 82 have their other ends in communication with first and second pressure regulators 84 and 86, respectively. Pressure regulators 84 and 86 each comprise a diaphragm 88 disposed across and sealing a pressure chamber, which diaphragms 88 each carry a metering means 90 to control the flow of more or less of fluid through the regulators. Regulators 84 and 86 further have springs 92 as biasing means to establish different "breaking" pressures in each one thereof.

The regulators 84 and 86 have outlet lines 94 and 96, respectively, which are throughconnected with a terminus of a control pressure line 98. Line 98 has the opposite end thereof in communication with a control pressure chamber 100 formed in regulator 18 on the side of diaphragm 68 which is opposite the bias pressure chamber 66. Regulators 84 and 86 have external bias-adjust controls 102 to establish the desired "breaking pressure" for the regulators.

The dimensions, the volumetric capacities, and like specifics of the stages 10, 12, and 14 are not given. The capacitive design of each will depend upon the measure of pressure-rated or flow-rated "fluid working" desired, and this consideration will also warrant an evaluation of the power machine available or planned for use. But, these are arbitrary matters which pertain not at all to the essence of my invention. My novel control system is applicable to any arrangement of plural stages, such as those illustrated in the figure, which is met with an adequate power source.

Only by way of example, to facilitate a disclosure of my invention, let it be assumed that stages 10, 12, and 14 are gas compressor stages so arranged that a single prime mover (not shown) rotates all three in synchronism. Also, it is to be assumed that the design configuration of the stages is such that, in serial operation, first stage 10 will intake the gaseous fluid at atmospheric pressure and pressurize it to approximately 25 p.s.i.g., second stage 12 will accept this product and further pressurize it to approximately 100 p.s.i.g., and the third stage 14 will increase the rating to approximately 250 p.s.i.g. Accordingly, the stages will not likely be of the similar size and configuration as apparently represented, but schematically, in the figure.

In considering system operation it should be assumed further that receiver 36 has contained therein a gaseous fluid pressure of something less than 250 p.s.i.g., and valves 28, 48, and 74 are arranged in the positioning "A" as illustrated. Valve 74 is position-changed by the system operator. Fluid is taken in through filter 16 and communicated through regulator 18 to the first stage 10 via line 20. In the first stage 10 the fluid is raised in pressure to approximately 25 p.s.i.g. Next the fluid is directed to the second stage 12 by means of outlet line 22 where it is further pressurized to approximately 100 p.s.i.g. Sequentially the fluid is communicated by outlet line 24, connecting line 26, open valve 28, and inlet line 30 to the third stage 14. Here the fluid is further pressurized to approximately 250 p.s.i.g. Thereafter the fluid is communicated through the receiver first inlet line 32 and the first check valve 34 to receiver 36 at a given volumetric flow rate.

To enable this 250 p.s.i.g., operation, valve 74 is manually placed in position "A." Thus, receiver pressure is communicated via line 60, line 72, valve 74, and again line 72 to one end of chamber 56. Here it displaces piston 54 in a given direction. Piston 54 displaces coupling means 50, and places and locks valves 28 and 48 in position "A." The other end of chamber 56 is vented, via line 76, valve 74, and line 78, to atmosphere. The fluid pressure in lines 38 and 42 prevents flow through check valves 40 and 44, respectively. That is, check valve 40 has a pressure differential thereacross proceeding from the ambient pressure on one side—where it is coupled to regulator 18—and approximately 100 p.s.i.g. on the opposite side—where it is coupled to line 30. Check valve 44 is interfaced with the same approximate 100 p.s.i.g. on one side, and an approximate 250 p.s.i.g. on the other side.

As the fluid pressure in receiver 36 gets beyond a rating of 250 p.s.i.g., to approximately 265 p.s.i.g., for example, the automatic unloading feature of my invention comes into operation. The receiver pressure-monitor line 60 communicates a measure of the fluid through control line 72 and 4-way valve 74 and from thence to pilot pressure line 80 to the first pressure regulator 84. The 15 pounds of excess pressure will unseat the metering means 90 and allow fluid to flow through regulator 84 to outlet line 94, and control pressure line 98, to throttle the intake regulator 18. Line 60 also communicates a biasing pressure by way of valve 64, and biasing line 62, to the presure chamber 66 to balance, overcome, or to be overcome by the control pressure introduced to control pressure chamber 100. In the stated circumstances, the control pressure in chamber 100 will overcome the bias pressure in chamber 66, and the intake regulator 18 will close. Accordingly, as the pressure rises, or drops due to demands of operating equipment, my automatic unloading will become more or less effective to throttle intake regulator 18.

The foregoing discussion reviewed the operation of my novel system in which the three stages 10, 12, and 14 were serially arranged. By a novel innovation my system comprises means for transforming the operation of the system to a combination of series and parallel operation of the stages.

The series and parallel operation of my system is arranged by an operator's changing of the setting of valve 74 to position "B." As a result of this, receiver pressure is communicated via line 60, a portion of line 72, valve 74, and line 76 to the end of chamber 56 opposite said one end. Here it operates on the piston 54 to translate coupling means 50 to change valves 28 and 48 to "B" position. Accordingly, valve 28 is now closed and valve 48 is open. Intake fluid is communicated by means of bypass line 38 to third stage 14 simultaneously with the intake of fluid by first stage 10, via line 20. This is possible because, with valve 28 closed, second check valve 40 is not now pressure-biased in a closed position. Third stage 14 provides for less than ambient pressure in the leg of line 38 disposed between valve 40 and stage 14. The output of both stages 10 and 14 are communicated to the second stage 12, the former by means of outlet line 22, and the latter by means of interstage line 46 and the now open second control valve 48. The product of the second stage 12 is communicated therefrom by second receiver inlet line 42 through check valve 44 to the receiver 36.

Second receiver inlet line 42 is in operation in this mode because the first control valve 28 is now in the closed position and check valve 34 is closed by the receiver pressure in line 32. When receiver pressure is at 115 p.s.i.g., or higher, the automatic unloading feature of my invention again operates in the same manner as described for the 250 p.s.i.g. operation, except that regulator 86 is then operative in the system instead of regulator 84.

In switching from series to parallel operation, i.e., from "A" to "B" positioning, the automatic unloading operates to reduce receiver pressure to approximately 100 p.s.i.g. Regulator 86, which is set for approximately 115 p.s.i.g. release, is met with the over-pressure of receiver 36 via line 60, a portion of line 72, a portion of line 76, and line 82. Thus it passes the over-pressure therethrough to chamber 100, closing regulator 18 until the receiver pressure is at or near 115 p.s.i.g.

The paralleling of stages 10 and 14, and the addressing the two outputs thereof to stage 12, increases the capacity of the system by approximately 13%, and maintains full lubrication conditions in all stages of the plurality. Operation of the system in either one or the other mode of operation is enabled by the manual displacement of the 4-way valve 74 between positions "A" and "B" and uses fluid pressure to effect the transfer. As explained in the preceding discussion, when valve 74 is in position "A," receiver pressure is operative against piston 54 to lock valves 28 and 48 in the "A" position. Likewise, when 4-way valve 74 is disposed in the "B" position fluid pressure locks valves 28 and 48 in that position. Further, my disclosure teaches a novel fluid control system having automatic unloading, operable in a plurality of modes of operation, and one providing for increased fluid discharge in one of the modes of operation.

I have disclosed my invention by way of a structural arrangement employing a directly-and manually-operated 4-way valve. Clearly, as it will occur to those skilled in the art, a remote control device, such as a solenoid actuator or the like, can be employed to operate the 4-way valve. Further, similar remote control arrangements, and local control arrangements other than that described herein, which open and close valves 28 and 48, and channel control and bias pressures to regulator 18, can be practiced, without departing from the spirit of my invention.

It is a teaching of my invention to provide means for serializing and/or paralleling stages of a plural-stage, fluid-working apparatus. Also, my disclosure teaches means usable with a serially-arranged, plural-stage, fluid-working apparatus to effect a paralleled-arrangement of some of the stages thereof. Accordingly, while I have described my invention in connection with a specific embodiment thereof, it is to be clearly understood that this is done only by way of example and not as a limitation to the scope of my invention as set forth in the objects thereof.

I claim:
1. A fluid control system, comprising:
    a plurality of stages for pressuring fluid admitted thereto;
    means for admitting fluid to said plurality;
    means for receiving pressured fluid from said plurality;
    fluid-operated valving means, coupled to said plurality and to said fluid admitting and receiving means, operative in differing modes to effect, in one mode of operation, only serialized functioning of all said stages and, in another mode thereof, paralleled functioning of at least some of said stages; and
    means interposed between said reeciving means and said valving means, for effecting a communication of operating fluid therebetween, having control means operable for causing said valving means to operate in any of said differing modes.
2. A fluid control system, according to claim 1 wherein:
    said fluid-operated valving means comprise an actuator having a cylinder and piston means carried by, and translatable relative to, said cylinder, for defining a variable volume chamber therein; and
    further comprising control valve means disposed between stages of said plurality operable for accommodating, and for prohibiting fluid flow therebetween;
    said piston means being coupled to said control valve means for operation of said control valve means coincident with translation of said piston means.
3. A fluid control system, according to claim 2, wherein:
    said piston means comprise a piston; and
    said control means comprise means for communicating operating fluid to either sides of said piston to effect translation thereof resulting in the disposing of said control valve means in differing operative modes
4. A fluid control system, according to claim 2 wherein:
    said control valve means comprise a plurality of valves ganged together for synchronous operation, one of said valves being in an open position when another valve thereof is in a closed position, said one valve to facilitate said flow accommodation and said another valve to effect said flow prohibition.
5. A fluid control system, according to claim 1 wherein:
    said fluid-operated valving means and said fluid admitting means comprise means selectively operative for directly and simultaneously admitting fluid to more than one stage and less than all stages of said plurality; and
    said fluid-operated valving means and said fluid receiving means comprise means selectively operative for directly receiving fluid from less than all stages and more than one stage of said plurality.
6. A fluid control system, according to claim 1, wherein:
    said valving means and said admitting means comprise means selectively operatively to provide for the direct admittance of fluid to but one of said stages.
7. A fluid control system, according to claim 1 wherein:
    said valving means and said receiving means comprise means selectively operative to provide for the direcet receipt of fluid but one of said stages.
8. A fluid control system, according to claim 1, further comprising:
    throttling means cooperative with said valving means automatically to unload the system when fluid pressuring exceeds predetermined limits; and
    pressure regulator means throughconnecting said throttling means and said communication means to establish pressuring limits at which said throttling means will be effective; and wherein
    said control means further comprise means for venting said pressure regulator means to the atmosphere.
9. A fluid control system, according to claim 1, wherein:
    said communication means and said fluid-operated valving means are co-operative to lock the system, selectively, in all of said operational modes.

References Cited

UNITED STATES PATENTS 3,060,858   10/1962   Shoosmith.
3,244,106   4/1966   Guy _____ 103—5

LOUIS K. RIMRODT, Primary Examiner

U.S. Cl. X.R.

103—11